United States Patent [19]

Klobucar et al.

[11] Patent Number: 5,162,092
[45] Date of Patent: Nov. 10, 1992

[54] GAS-ASSISTED INJECTION MOLDING WITH A CARPET LAYER

[75] Inventors: Keith P. Klobucar, Holland; Laurie A. Weeks, Lowell; Matthew J. Holwerda, Hudsonville; S. Noland Broaddus, Grand Rapids, all of Mich.

[73] Assignee: Cascade Engineering, Inc., Grand Rapids, Mich.

[21] Appl. No.: 619,760

[22] Filed: Nov. 29, 1990

[51] Int. Cl.$^5$ ............ B29C 45/16; B29C 49/20; B29D 22/00; B32B 31/00

[52] U.S. Cl. ............ 264/513; 264/243; 264/257; 264/266; 264/275; 264/324; 264/328.8; 264/328.12; 264/328.13; 264/328.18; 264/331.17; 264/331.18; 264/331.19; 264/516; 264/572

[58] Field of Search ............ 264/85, 243, 257, 266, 264/275, 276, 279, 324, 328.8, 328.12, 328.13, 328.18, 331.17, 331.18, 331.19, 500, 510, 512, 513, 516, 572

[56] References Cited

U.S. PATENT DOCUMENTS

| | | | |
|---|---|---|---|
| 1,939,293 | 12/1933 | Cavanagh et al. | 264/232 |
| 2,054,499 | 9/1936 | Florman | 428/77 |
| 3,157,557 | 11/1964 | Palmer | 428/17 |
| 3,258,511 | 6/1966 | McGregor, Jr. | 264/46.4 |
| 3,616,110 | 10/1971 | Kutik et al. | 428/53 |
| 3,655,308 | 4/1972 | Kutik et al. | 425/520 |
| 3,755,031 | 8/1973 | Hoffman et al. | 156/79 |
| 3,793,415 | 2/1974 | Smith | 264/45.2 |
| 3,894,823 | 7/1975 | Hanning | 425/130 |
| 3,956,551 | 5/1976 | Richards | 428/88 |
| 3,972,970 | 8/1976 | Taylor | 264/45.9 |
| 4,017,225 | 4/1977 | Hanning | 425/4 R |
| 4,033,710 | 7/1977 | Hanning | 425/543 |
| 4,101,617 | 7/1978 | Friederich | 264/572 |
| 4,106,887 | 8/1978 | Yasuike et al. | 425/549 |
| 4,115,491 | 9/1978 | Hanning | 264/45.1 |
| 4,129,635 | 12/1978 | Yasuike et al. | 264/45.5 |
| 4,136,220 | 1/1979 | Olabisi | 428/159 |
| 4,140,672 | 2/1979 | Kataoka | 264/45.1 |
| 4,186,235 | 1/1980 | Bramwell | 428/286 |
| 4,323,406 | 4/1982 | Morello | 156/91 |
| 4,377,610 | 3/1983 | McClung, Jr. | 428/88 |
| 4,418,031 | 11/1983 | Doerer et al. | 264/241 |
| 4,491,556 | 1/1985 | Fujii et al. | 264/243 |
| 4,498,860 | 2/1985 | Gahan | 425/562 |
| 4,529,639 | 7/1985 | Peoples, Jr. et al. | 428/95 |
| 4,555,225 | 11/1985 | Hendry | 425/4 R |
| 4,579,764 | 4/1986 | Peoples, Jr. et al. | 428/95 |
| 4,634,565 | 1/1987 | Irrgang | 264/510 |
| 4,740,150 | 4/1988 | Sayer | 425/542 |
| 4,824,732 | 4/1989 | Hendry et al. | 428/542.8 |
| 4,968,474 | 11/1990 | Ito | 264/513 |

FOREIGN PATENT DOCUMENTS

55-159934  12/1980  Japan ............ 264/516

Primary Examiner—Leo B. Tentoni
Attorney, Agent, or Firm—Varnum, Riddering, Schmidt & Howlett

[57] ABSTRACT

A process for injection molding a thermoplastic backing (12) or other synthetic resin to a carpet layer (14) by suspending the carpet layer (14) between two mold halves (46,48), injecting a thermoplastic resin into the mold, and injecting an inert fluid such as nitrogen into the mold at a relatively low pressure to assist in distribution of the thermoplastic resin throughout all points of the mold. The invention also relates to a synthetic resin backed carpet, which resin backed carpet may constitute a vehicle dashboard (10). The vehicle dashboard (10) can include an internal runner or rib (16) which has a hollow portion (52) formed substantially along its length, the hollow portion (52) being formed by injection of the inert fluid during the injection molding process.

22 Claims, 5 Drawing Sheets

GAS-ASSISTED INJECTION MOLDING WITH A CARPET LAYER

BACKGROUND OF THE INVENTION

1. Field of the Invention

This invention relates to a synthetic resin backed carpet. In one of its aspects, the invention relates to a process for injection molding a thermoplastic backing to a carpet layer. In another of its aspects, the invention relates to a synthetic resin backed carpet and to a vehicle dashboard panel formed of a synthetic resin backed carpet. In another of its aspects, the invention relates to the above injection molding process, whereby the process utilizes a low pressure gas-assist.

2. Description of the Related Art

Adhesives have long been used to bond a layer of carpet to a carpet mat base, wherein the base is an injection molded synthetic resin. These products have been domestically used as bath mats and throw rugs. Other applications for such products have included uses in connection with vehicles: door panels, vehicle dashboards, side wall trims, head liners, and floor mats. Other applications for such products can also be contemplated such as for office furniture wall panels.

It has been found that much adhesive must be used to bond the carpet mat base to the carpet layer. Also, a huge initial cost for production of such products is incurred since an applicator, dryer, conveyor and a press must be purchased to carry out the application and bonding operations. The cost of the adhesive and the bonding operations account for the greater part of the overall cost of the finished product. Applying the right amount of adhesive without fouling the edges of the mat base and bonding it to the carpet in registry requires highly skilled personnel. Furthermore, most adhesives deteriorate due to heat or moisture and will not exhibit high adhesion strength over an extended period. Another factor that reduces the bonding strength of the adhesive is the uneven surface of the back side of the carpet which causes a gap between the mating surfaces. For these reasons, the strength of the bond formed between the mat base and the carpet by an adhesive is smaller than that achieved by fusion of the resin of which the mat base is made.

In an ever-increasing effort to improve adhesion between the carpet mat base and the layer of carpet and reduce the costs of adhering the carpet to the carpet mat base, inventors have found that the carpet can be placed inside an injection molding apparatus in order to injection mold the carpet to the base. By injection molding the carpet to the base, adhesion can be greatly improved because the carpet is fused to a portion of the synthetic resin base. Also, the costs of producing the finished product have been greatly reduced because there are no material costs for the adhesive and because the precise application and bonding operations by skilled personnel are no longer required. U.S. Pat. No. 4,491,556 issued Jan. 1, 1985 to Fujii et al. discloses one such injection molding process.

Although the process disclosed in the Fujii et al. patent has in many respects proved preferable to the conventional means for adhering a carpet layer to a synthetic resin backing, the process is undesirable in many respects. For instance, because a very high injection pressure of the synthetic resin is used, tearing and matting of the carpet layer often occur. Secondly, high injection pressures tend to cause problems with "bleed through," which is a penetration of the entire carpet layer in certain spots by the synthetic resin.

Thus, there is a need for a process which is capable of injection molding a layer of carpet to a synthetic resin backing. The process must produce a layer of carpet which is firmly adhered to a synthetic resin, while not causing tearing or matting of the carpet layer. Furthermore, bleed through of the synthetic resin into the carpet layer must be eliminated.

SUMMARY OF THE INVENTION

According to the invention, there is provided a process for making a carpet with a synthetic resin substrate, the carpet having a fibrous surface and a back surface, the process comprising the steps of providing a relatively thin mold cavity defined by first and second opposed mold surfaces, positioning a carpet in the mold cavity with the fibrous surface oriented toward the first mold surface, injecting molten synthetic resin into the mold into contact with the carpet back surface, injecting a fluid into the synthetic resin to force the synthetic resin to spread throughout the entire mold to fill all portions of the cavity to thereby integrally bond the synthetic resin to the back surface of the carpet, cooling the synthetic resin to a solid form, and thereafter removing the carpet-backed article from the mold cavity.

The second mold cavity surface preferably defines an elongated rib cavity and the synthetic resin can be injected into the rib cavity. The fluid can also be injected into the rib cavity to form a substantially hollow rib in the synthetic resin substrate. The fluid must be inert with respect to the synthetic resin, and preferably comprises an inert gas.

The mold cavity surfaces can be disposed in different orientations, but preferably are disposed vertically. The carpet can then be hung from an upper portion of one of the mold cavities prior to the synthetic resin injecting step. The carpet can also be pinched in appropriate locations inside the mold so that the carpet does not wrinkle during molding. For example, the process can further include the step of retaining the carpet between first and second surface portions of the mold cavity at a bottom thereof prior to the synthetic resin injecting step. The synthetic resin can flow from a central portion of the cavity toward the edges of the cavity.

A wide variety of synthetic resins can be used in the process. The synthetic resin can be selected from the group consisting of a talc filled polypropylene, a mineral filled polypropylene, barium sulfate filled polypropylene, unfilled ABS, unfilled nylon materials, polyvinyl chloride (PVC), and blends thereof. However, the synthetic resin is preferably a rigid thermoplastic resin, such as a filled polypropylene.

The carpet can comprise a number of woven and nonwoven carpets. Optimum results have been obtained by using a six ounce Toni cloth which has a backing layer of a synthetic resin different from the synthetic resin substrate.

The conditions under which the process is carried out can vary over a wide range. With respect to injection pressures, the synthetic resin is injected into the mold cavity at an elevated pressure generally in the range of 10,000 to 11,000 psig, and the fluid is injected into the synthetic resin at a pressure generally in the range of 300 to 750 psig. With respect to the temperature of the injected synthetic resin, it should generally be in the range of 380° to 440° F.

The invention also provides a dashboard filler panel comprising a rigid thermoplastic substrate, generally rectangular in configuration and having a front surface, a back surface, both of which are defined by an upper edge, a lower edge and connecting side edges, the substrate having a relatively thin cross section relative to the height and width of the substrate, a rib extending across the back surface of the substrate, the rib being hollow along a substantial portion of its length, and carpet added to the front surface of the substrate, the carpet covering substantially the entire front surface of the substrate.

The dashboard filler panel can include holes in the bottom portion of the substrate for vent openings. The carpet can extend into the holes in the substrate. The dashboard filler panel can also include depending flanges on side edges thereof, the carpet extending down along the depending flanges.

The thermoplastic substrate of the dashboard filler panel can be made from the same materials which are listed above in regard to the synthetic resin used in the process of the present invention.

The carpet of the dashboard filler panel includes portions of fibers which are embedded in a transition layer. The transition layer comprises a blend of a polymer comprising the thermoplastic substrate and a softer polymer. The softer polymer is preferably a latex polymer.

The invention further provides a laminated panel having a carpet layer and synthetic backing therefore, the panel comprising a substrate formed of relatively rigid synthetic resin polymer, the substrate being generally rectangular in configuration and having a front surface and a back surface, both of which are defined by an upper edge, a lower edge, and connecting side edges, the substrate being relatively thin in cross section relative to the height and width of the front and back surfaces, a carpet layer bonded to the front surface of the substrate, the carpet layer covering substantially the entire front surface of the substrate, and a transition layer having portions of fibers of the carpet layer integrally formed with the substrate, said transition layer comprising a blend of the relatively rigid synthetic resin polymer and a softer polymer which promotes adhesion of the synthetic backing to the carpet layer. Preferably, the softer polymer is a latex polymer.

BRIEF DESCRIPTION OF THE DRAWINGS

The invention will be described with reference to the drawings in which.

DETAILED DESCRIPTION OF THE DRAWINGS

It has been found that a layer of carpet can be injection molded to a synthetic resin substrate to form a synthetic resin backed carpet layer. Several applications for this finished product are possible. For instance, the finished product can be used as an upper dashboard for vehicles. The product can also be used for interior trim applications such as for door panels, sidewall trims, headliners, and office furniture wall panels. In the following description of the preferred embodiment, the process will be described in reference to the making of a vehicle dashboard. However, the invention is understood to have broader applications, and is not meant to be limited to the production of a vehicle dashboard only.

Figure 1:
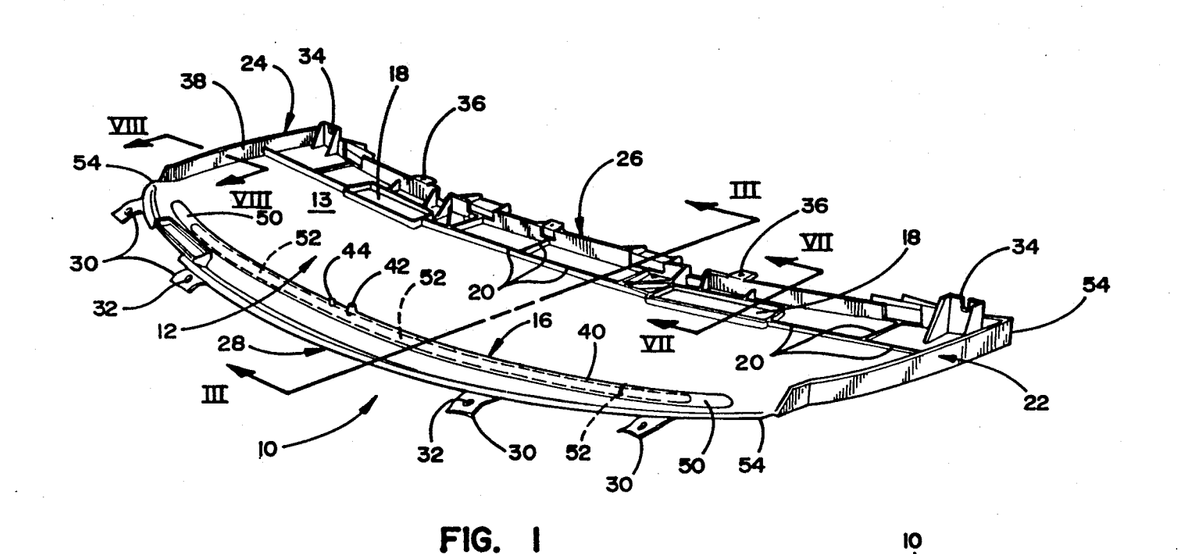
FIG. 1 is a perspective view of an underside of a vehicle dashboard panel having a carpet layer with a rigid plastic backing according to the invention.
Figure 2:
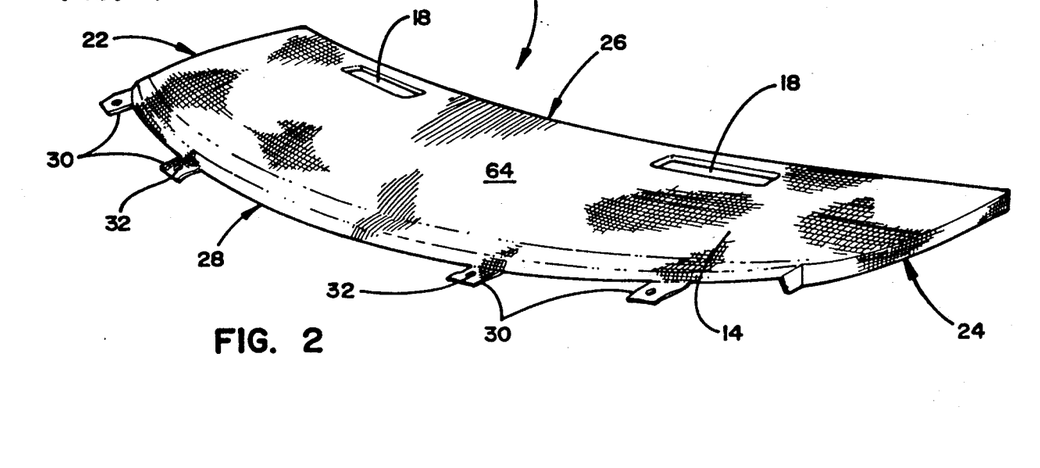
FIG. 2 is a perspective view of a top side of the vehicle dashboard panel illustrated in FIG. 1.

Referring to FIGS. 1 and 2, a vehicle dashboard 10 produced according to the invention comprises a thermoplastic backing 12 and a carpet layer 14. Reference in the following description to a "top" of the vehicle dashboard 10 refers to a surface of the vehicle dashboard 10 having the carpet layer 14 disposed thereon, as shown in FIG. 2. Reference to a "bottom" or "underside" of the vehicle dashboard 10 refers to an exterior surface of the thermoplastic backing 12, as shown in FIG. 1. Preferably, the vehicle dashboard 10 also includes an internal runner or rib 16 formed on the thermoplastic backing 12 (underside of the dashboard 10). The internal runner 16 extends substantially across the bottom of the dashboard 10 but does not reach the side edges thereof.

The vehicle dashboard 10 preferably includes the internal runner 16, two defroster openings 18 and strengthening ribs 20. The strengthening ribs 20 are formed on the thermoplastic backing 12 near and adjacent to two sides edges 22, 24 and a bottom edge 26 of the vehicle dashboard 10. A plurality of carpet layer tabs 30 extend outwardly from an upper edge 28 of the vehicle dashboard 10. Each of the carpet layer tabs 30 has a circular aperture 32 therein. Downwardly extending installation brackets 34 are mounted to the thermoplastic backing 12 at the bottom edge 26 of the vehicle dashboard 10 at each side edge 22, 24 of the vehicle dashboard 10.

Figure 5:
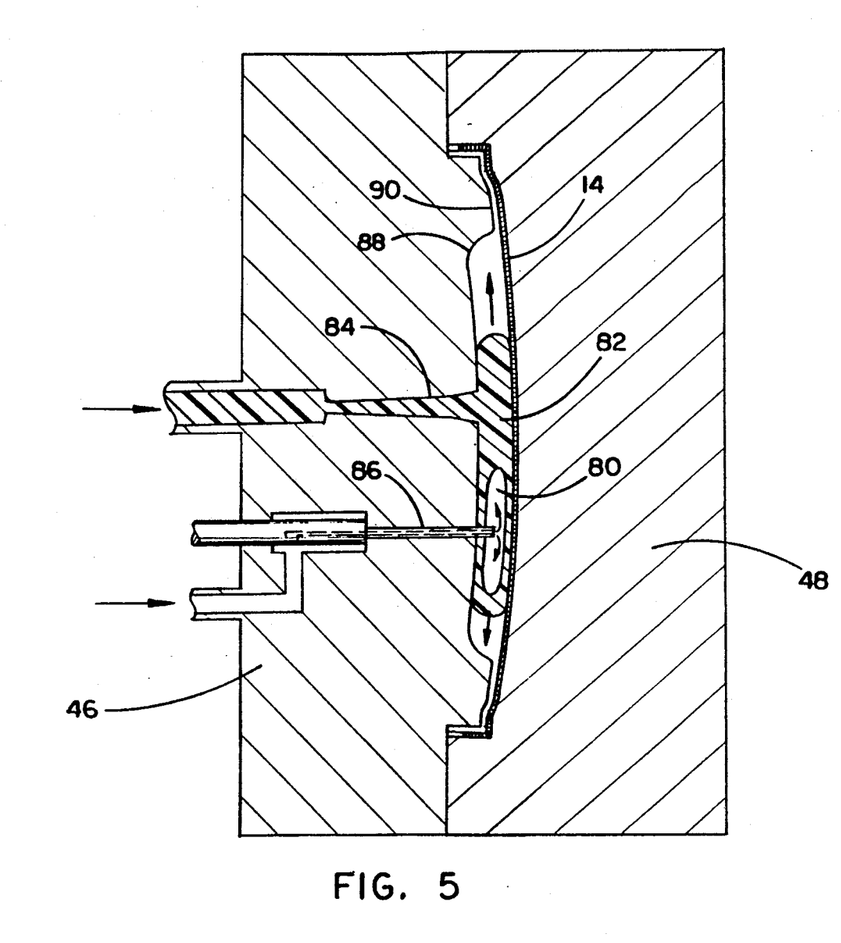
FIG. 5 is a schematic horizontal sectional view of a mold, illustrating the method of making the dashboard panel or similar article according to the invention.

As clearly shown in FIG. 1, the internal runner 16 protrudes from the thermoplastic backing 12 and has a semicylindrically shaped exterior surface 40. The internal runner 16 is located near the fourth side 28 of the vehicle dashboard 10 and spans substantially the entire width of the vehicle dashboard 10. A nipple 42 is formed on the exterior surface 40 of the internal runner 16 and is located near the longitudinal center of the internal runner 16. Located relatively near the nipple 42 is an aperture 44 formed in the internal runner 16. The nipple 42 denotes the location at which thermoplastic material is injected between each mold half 46,48 (FIG.

5) of an injection molding apparatus. The aperture 44 denotes the location at which nitrogen is injected between the mold halves 46, 48.

In the preferred embodiment, a substantial amount of the internal runner 16 is hollow. For example, approximately 80% of the internal runner 16 can be hollow. Thus, approximately 20% of the internal runner 16 can be formed of generally solid thermoplastic material. Accordingly, about a 10% length of the internal runner 16 can be formed of solid thermoplastic material at each end of the internal runner 16. These two portions of the internal runner 16 are designated as solid portions 50 in FIG. 1. The remainder of the internal runner 16 located between the solid portions 50 is hollow, and is designated in FIG. 1 as a hollow portion 52.

The size, placement and diameter of the internal runner 16 are very important. The diameter of the internal runner 16 must be large enough such that an appropriate amount of nitrogen can be injected to force the thermoplastic material into the farthest points of the mold.

Another important aspect of the invention is the size of a carpet blank used in practicing the invention. If an optimal blank size for the carpet is used, the carpet will get pinched during molding only in certain desired locations. Pinching occurs when the carpet layer 14 gets sandwiched between the two mold halves 46, 48.

Figure 7:
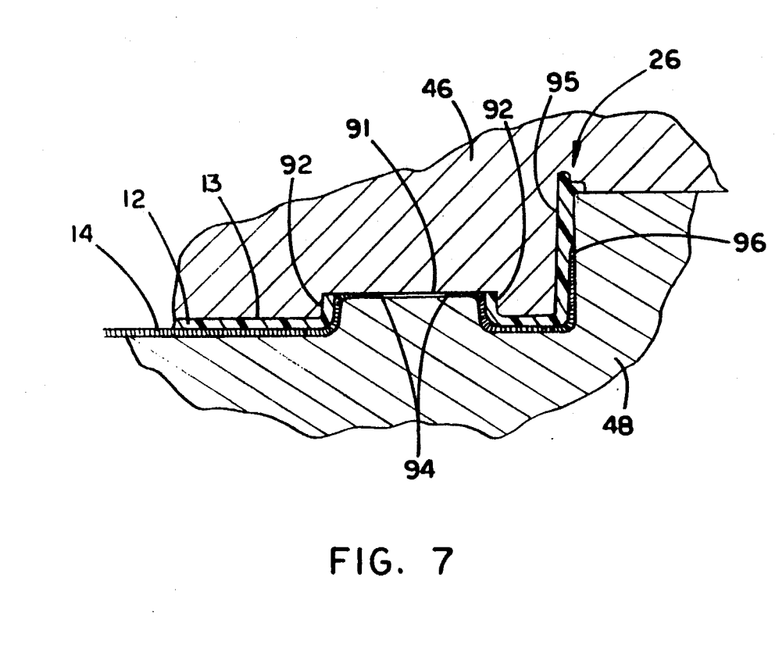
FIG. 7 is a sectional view of the vehicle dashboard panel taken along lines 7—7 of FIG. 1, illustrating the method of making this portion of the dashboard panel according to the invention.

Referring to FIG. 7, a portion of the dashboard 10 is shown while it is still in the mold and near the end of the injection molding process. Pinching of the carpet layer 14 in the area of the defroster openings 18 is accomplished by providing a carpet blank having relatively small openings (91) in the carpet blank for formation of the defroster openings 18. Because such small openings (91) are provided in the carpet blank at each of these two locations, the excess carpet material gets pinched between the mold halves 46,48. Pinching at these two locations has proved to be desirable in making the vehicle dashboard 10 because this pinching prevents formation of wrinkles in the carpet layer 14. Side walls 92 of the thermoplastic backing 12 define the perimeter of the defroster openings 18. Within the perimeter of the defroster openings 18, the carpet layer 14 is pinched between the mold halves 46, 48. Edges 94 of the carpet layer 14 define the perimeter of the small openings 91 of the carpet layer. The bottom edge 26 of the dashboard 10 comprises a downwardly depending flange 95. The carpet layer 14 extends down a portion of the downwardly depending flange 95 and terminates at a bottom border 96. The remaining portion of the flange 94 is formed of thermoplastic material only.

Figure 8:
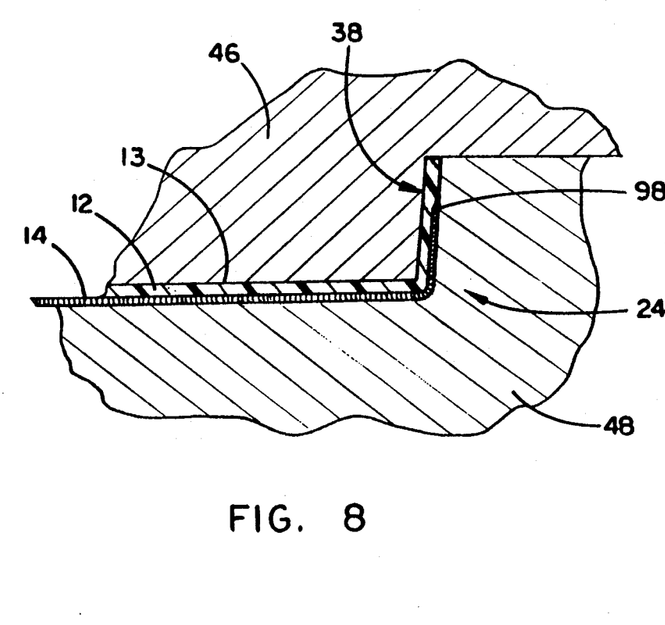
FIG. 8 is a sectional view of the vehicle dashboard panel taken along lines 8—8 of FIG. 1, illustrating the method of making this portion of the dashboard panel according to the invention.

Referring to FIG. 8, the side edge 24 of the vehicle dashboard 10 is shown in detail while the dashboard 10 is still in the mold and near the end of the injection molding process. As can easily be seen, the side edge 24 includes a downwardly depending flange 38. The carpet layer 14 extends down a portion of the downwardly depending flange 38 and terminates at a side border 98. As can easily be seen, the carpet layer 14 is not pinched at the side edge 24 of the dashboard 10. Once the vehicle dashboard 10 is installed in a vehicle, most of the side edge 24 cannot be seen by passengers in the vehicle. Accordingly, once the vehicle dashboard 10 is installed, generally only the smooth carpet layer 14 on the top of the vehicle dashboard 10 can be seen.

The carpet layer 14 is inserted into the mold before injection molding such that it hangs freely within the mold. The carpet layer 14 is positioned in the mold by placing the apertures 32 within the carpet layer tabs 3 around a plurality of bosses extending from one of the mold halves. The carpet layer tabs 30 get pinched between the mold halves 46, 48 during the molding process. By pinching the carpet layer 14 at certain locations and letting it hang freely in other locations, tearing of the carpet layer 14 at the corners 54 of the vehicle dashboard 10 can be eliminated.

Figure 3:
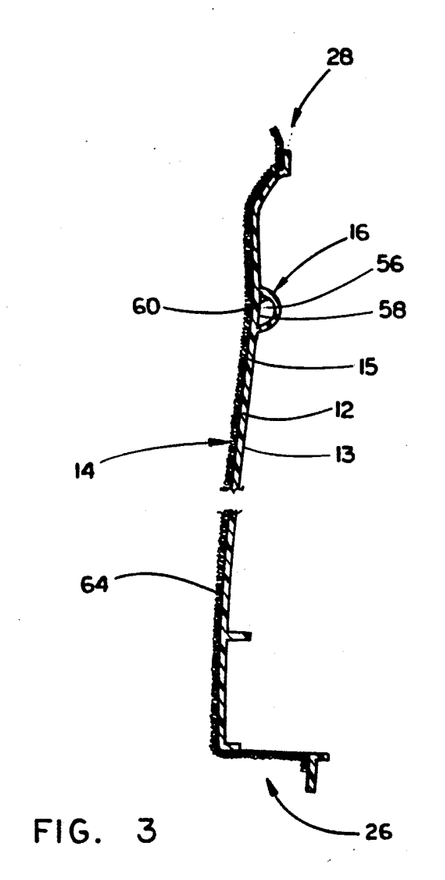
FIG. 3 is an enlarged sectional view taken along lines 3—3 of FIG 1.

Referring to FIG. 3, the hollow portion 52 of the internal runner 16 includes a cavity 56 extending longitudinally of the internal runner 16. The cavity 56 is formed by a back wall 58 and an interior arcuate wall 60 of the internal runner 16. The carpet layer 14 adheres to the thermoplastic backing 12 and thus, generally takes the shape of a front surface 15 of the thermoplastic backing 12. The carpet layer 14 preferably adheres to the thermoplastic backing 12 such that no defects are formed in the carpet layer 14 and such that no wrinkling of the carpet layer 14 takes place. For example, one defect which is undesirable is a hole in the carpet layer 14 formed by "bleed through" or penetration of the thermoplastic material through the carpet layer 14 to an exterior surface 64 of the carpet layer 14. Bleed through is generally caused by a thermoplastic injection pressure which is too high or by use of thermoplastic materials having high melt temperatures. The present invention solves bleed through problems by using a low pressure gas-assisted injection molding process with thermoplastic materials having relatively low melt temperatures.

Figure 4:
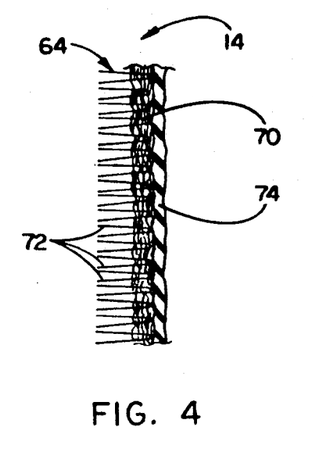
FIG. 4 is an enlarged sectional view of the carpet layer used in a first step in making the vehicle dashboard according to the invention.

Referring to FIG. 4, the carpet layer 14 as it appears before injection molding is shown in section. The carpet layer 14 preferably comprises a non-woven base 70, nylon filaments 72 which are woven to the non-woven base 70 through a needle-weaving process, and a latex backing 74 which is sprayed onto the non-woven base 70. The latex backing 74 secures the nylon filaments 72 to the non-woven base 70 and enhances adhesion of the carpet layer 14 to the thermoplastic backing 12. The carpet layer 14 preferably comprises a 6 ounce Toni cloth manufactured by J. P. Stevens, designation WT3ABB to a General Motors, Inc. specification. This product is a nylon filament, solutiondyed woven fabric.

The invention utilizes a process disclosed in two United States patents. Accordingly, the disclosures found in these two patents, U.S. Pat. No. 4,740,150, issued Apr. 26, 1988 to Sayer and U.S. Pat. No. 4,824,732, issued Apr. 25, 1989 to Hendry et al., are hereby incorporated by reference for purposes of teaching this process. These two patents disclose a low pressure gasassisted process (referred to hereinafter as the "Cinpres process") for producing an injection molding of thermoplastic material. Although the Cinpres process is believed to be the best process for injection molding the thermoplastic backing to the carpet layer, other low pressure gas-assisted processes could also be used, such as the process described in British Patent Specification No. 2,139,548.

The Cinpres process comprises introducing thermoplastic material in the form of a molten stream into a mold space, measuring a quantity of an inert gas such as nitrogen by filling a chamber with the nitrogen and holding it in the chamber under pressure, said measured quantity being sufficient to achieve an intended weight reduction in the resultant injection molding and to create a required internal pressure in the molding to be formed, and injecting the nitrogen into the stream of the thermoplastic material. Injection of the nitrogen assists in formation of the finished product by causing the thermoplastic material to completely fill the surfaces of the mold. Also, the nitrogen can be heated before injecting it into the mold.

The preferred process of the present invention expands upon the Cinpres process by placing a layer of carpet 14 within the mold in order to form a rigid thermoplastic backing 12 having a layer of carpet 14 adhered to it. The present invention provides a differently configured mold and provides different locations inside the mold for injection of the thermoplastic material and the nitrogen. These aspects of the present invention will be described in further detail below.

FIG. 5 illustrates use of the Cinpres process to make a vehicle dashboard 10 according to the invention. FIG. 5 shows the interior of the mold at a point in time near the end of the thermoplastic injection, during a time when nitrogen is being injected into the mold. An injection sprue 84 is used to inject thermoplastic material 82 into the mold, while an injection nozzle 86 is used to inject nitrogen 80 into the mold. At this point in time, the nitrogen 80 is advancing longitudinally in each direction toward the ends of a cavity 88 for forming the internal runner 16. A cavity 90 assists in formation of the dashboard 10 but is not used to form the internal runner 16. The nitrogen 80 preferably remains in the internal runner 16 and provides for an increased pressure within the mold, encouraging injected thermoplastic material 82 to fill all surfaces of the mold.

Figure 6:
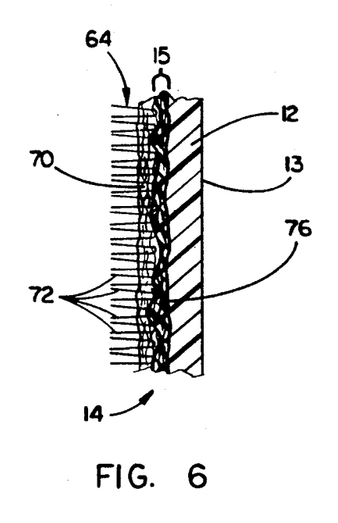
FIG. 6 is an enlarged sectional view of a portion of the dashboard panel illustrated in FIG. 1.

Referring to FIG. 6, penetration of the carpet layer 14 by thermoplastic material is shown. The thermoplastic material penetrates the latex backing 74 and encapsulates the filaments 72 of the carpet layer 14, thereby providing for excellent adhesion between the carpet layer 14 and the thermoplastic backing 12.

The thermoplastic material is preferably a filled polyolefin, such as polypropylene filled with talc. Other fillers which can be used include glass fibers and minerals such as vermiculite. The filler comprises about 40% of the product by weight and provides stiffness to the overall composition. The thermoplastic material can be selected from the group consisting of a talc filled polypropylene, a mineral filled polypropylene, barium sulfate filled polypropylene, unfilled ABS, unfilled nylon materials, polyvinyl chloride (PVC), and blends thereof.

The melt temperature of the thermoplastic material can range from about 350° to 450° F., and is preferably about 400° F. The viscosity of the thermoplastic material dictates what temperatures and pressures are used in the mold. The viscosity of the thermoplastic material preferably ranges from about 10 to 18 grams per 10 minutes, measured in accordance with ASTM test standard D-1238, condition L.

The injection pressures of the thermoplastic material and the nitrogen are dependent upon the viscosity of the thermoplastic material, thickness of the thermoplastic backing 12, location at which the thermoplastic material is injected, and how far the thermoplastic material must travel to fill all points of the mold. Accordingly, the injection pressures will vary as each of the above variables are changed.

Figure 9:
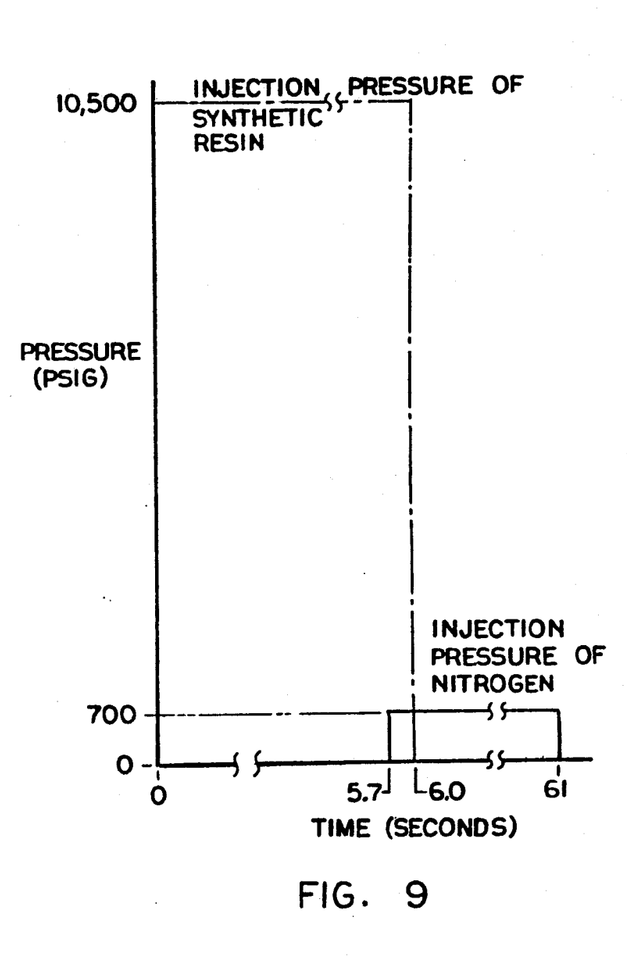
FIG. 9 is an injection profile, showing the injection pressures of materials used in making the dashboard panel according to the invention.

The injection pressure of the thermoplastic material is limited to avoid striping and tearing of the carpet layer 14 but is high enough to spread the thermoplastic material at least partially along the internal runner 16. The injection pressure of the nitrogen is high enough to assist in distribution of the thermoplastic material throughout all points of the mold. Referring to FIG. 9, the injection pressures of the synthetic resin and the nitrogen (or other inert gas) are shown as a function of time. The synthetic resin can be injected at about 10,500 psig for approximately 6.0 seconds. A relatively low pressure, about 700 psig, of nitrogen is injected near the end of the synthetic resin injection. For example, the nitrogen can be injected about 5.7 seconds after the first injection of synthetic resin and can be terminated about 61 seconds after the first injection of synthetic resin.

It has been found that when woven carpets are used, the direction of the warp threads or nap of the carpet layer 14 is important. When the carpet layer 14 is positioned within the mold halves 46, 48, the warp threads of the carpet layer extend in a certain direction with respect to the mold halves 46, 48. It has been found that this direction of the warp threads is critically important in controlling a carpet defect known as zebra striping. The term zebra striping refers to a striped color pattern in the carpet layer 14. It has been found that if zebra striping is occurring, it can be controlled by changing the direction of the ward threads with respect to the mold halves 46, 48. The direction of the warp threads should be changed by 90°. This can be done by cutting the carpet differently in forming the carpet blank. The direction of the cuts in the carpet to form the carpet blank should be offset 90 from the direction in which the carpet was originally being cut. When placed between the mold halves 46, 48, this differently cut carpet blank will then have warp threads which extend 90° away from their original direction. More specifically, it has been found that the warp threads of the carpet layer 14 should extend horizontally when the carpet layer 14 is placed inside the mold, not vertically.

Figure 10:
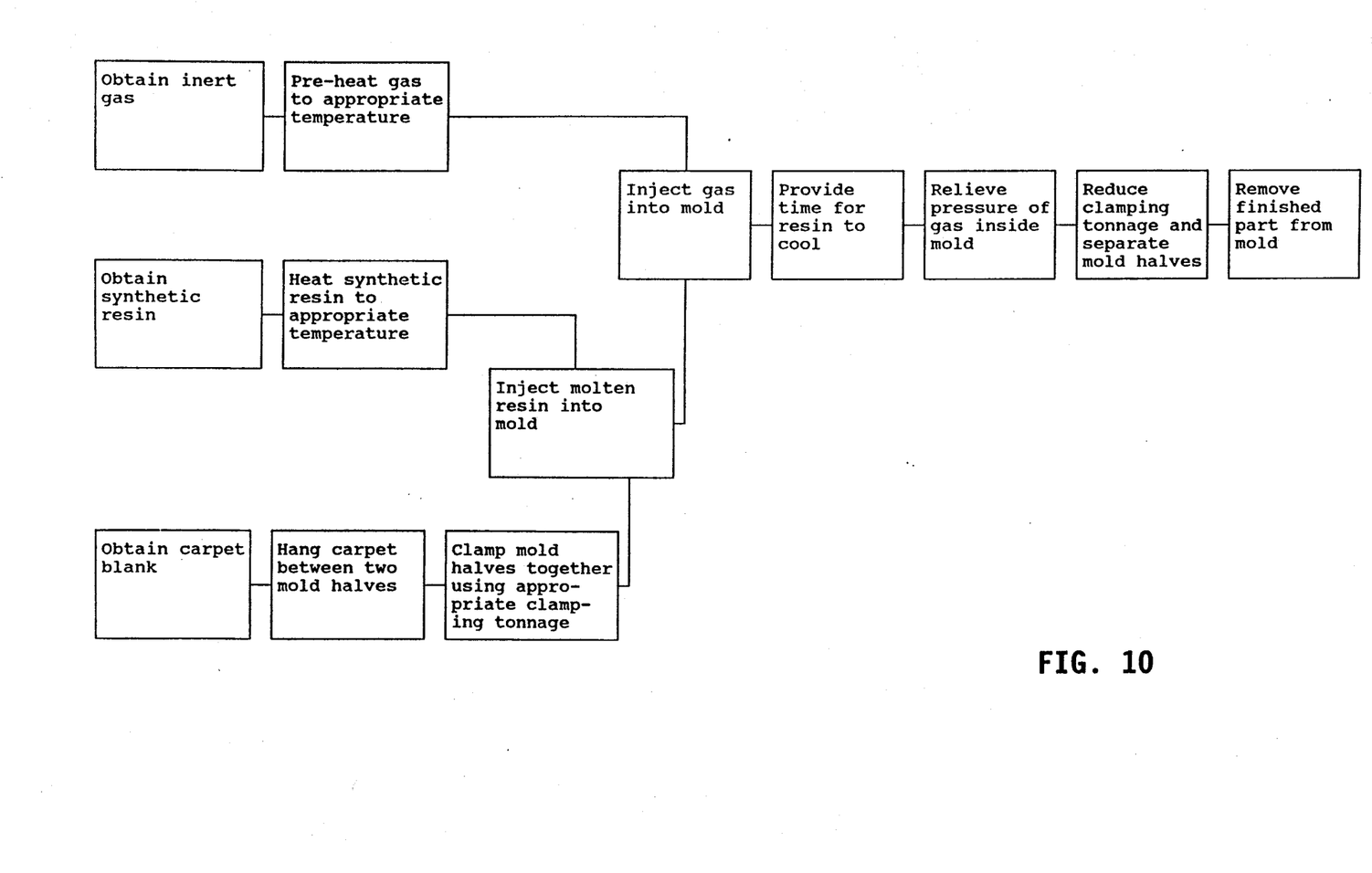
FIG. 10 is a block diagram flow chart illustrating the steps used to mold the dashboard panel or similar article according to the invention.

Referring to FIG. 10, a synthetic resin backing can be injection molded to a carpet layer by following the steps shown. First, sufficient quantities of synthetic resin and inert gas can be obtained. Second, an appropriately sized carpet blank can be obtained. Third, the inert gas and the synthetic resin should be heated to their respective appropriate temperatures. The carpet should be hung between two mold halves, which are then clamped together using an appropriate clamping tonnage. The molten resin is then injected into the mold. About 5.7 seconds later, the pre-heated inert gas can be injected into the mold. Next, sufficient time must be provided to allow the resin to cool. The gas pressure inside the mold can be relieved. After reducing the clamping tonnage, the mold halves can be separated so that the molded part can be removed.

EXAMPLE 1

The process disclosed in this Example is believed to be the best means for carrying out the process of the present invention. Consequently, the article produced by this process is believed to be the best article which can be produced according to the present invention.

A vehicle dashboard having a carpet layer adhered to a rigid thermoplastic backing was made by obtaining a six ounce Toni cloth layer of carpet manufactured by J. P. Stevens, designation WT3ABB to a General Motors, Inc. specification. This carpet layer had four tabs extending outwardly from an upper edge of the carpet layer. The tabs had circular apertures therein. One of the mold halves was provided with four cylindrical pins which protruded from the surface of the mold half. The carpet layer was suspended within the mold by placing the circular apertures of the four tabs around the cylindrical pins of the mold half. Thus, the carpet layer hung freely within the mold. In addition, small openings were provided in the carpet blank at two locations near a bottom edge of the carpet blank which were intended to correspond to defroster openings in the finished vehicle dashboard. The mold halves were closed tightly by an injection molding apparatus which had a clamping tonnage of 950 tons.

A measured shot of 40% talc filled polypropylene (purchased from Washington Penn Corporation and sold under the tradename PPH 3TF4) having a density of 1.25 grams/cm$^3$ was heated to a temperature of 400° F. and injected into the mold in 6.03 seconds, using a hydraulic injection pressure of about 11,000 psig. As soon as the injection of 40% talc filled polypropylene terminated, the clamping tonnage of the injection molding apparatus was reduced to 750 tons.

At a time of 5.7 seconds after the first injection of 40% talc filled polypropylene, nitrogen at a temperature of 870° F. was injected into the mold, using a gas charging pressure of about 720 psig. This injection of nitrogen continued for 2.2 seconds at a rate sufficient to introduce a measured quantity of nitrogen into the mold.

The measured quantity of nitrogen was determined by choosing an amount which at an injection pressure of 720 psig would occupy an interior space within an interior runner extending longitudinally of the mold. The nitrogen containing cavity within the internal runner was intended to extend about 80% of the length of the internal runner. The quantity of 40% talc filled polypropylene was then selected by selecting an amount which would fill the interior surfaces of the mold.

The thermoplastic backing was allowed to cool within the mold while the mold was subjected to the 750 ton clamping tonnage. In the area of the defroster openings, the carpet layer was pinched between the mold halves. In addition, the four tabs extending outwardly from an upper edge of the carpet layer were also pinched.

From 60.7 to 66.03 seconds after the first injection of thermoplastics material, the nitrogen pressure within the mold was reduced to atmospheric pressure. At a time of 66.03 seconds after the first injection of the thermoplastics material, the clamping tonnage was reduced to zero so that the mold halves could be separated from one another.

A finished thermoplastic part, the vehicle dashboard, was then removed from the mold. The finished part weighed about 3,200 grams. When the carpet was compressed, the part had a 3.5 millimeter wall thickness. The part had a generally rectangular shape and was about 1.5 meters wide and about 0.45 meters in length. A rib extended from the back surface of the part near an upper edge of the part and extended about 1.3 meters along the length of the part. The rib was shaped in the nature of a semi-cylinder. The rib had a radius measured to its outside surface of about 10 millimeters.

Upon inspection, the vehicle dashboard had a layer of carpet firmly adhered to a rigid thermoplastic backing. The layer of carpet was smooth and was free of wrinkles. Furthermore, the 40% talc filled polypropylene had not penetrated entirely through the layer of carpet. Thus, bleed through had not occurred.

EXAMPLE 2

The procedure of Example 1 was repeated except the nitrogen charging pressure was reduced to 600 psig and the nitrogen was pre-heated to 900° F. The polypropylene was injected in 6.06 seconds, and the gas was introduced 5.5 seconds after the first injection of thermoplastic material and removed at 60.5 seconds after the first injection of thermoplastic material. A satisfactory adhesion of the carpet layer to the thermoplastic backing was again obtained. The layer of carpet was smooth and free of wrinkles. The polypropylene did not bleed through the carpet layer.

EXAMPLE 3

The procedure of Example 1 was repeated except an unfilled ABS was used as the thermoplastic material. This material was purchased from Dow Chemical Corporation and is sold under the trademark Dow Pulse ABS 959. The first clamping tonnage was 1,000 tons and the second tonnage was 950 tons. The thermoplastic material was heated to a temperature of 520° F. and injected in 6.23 seconds. The nitrogen was injected 5.5 seconds after the first injection of thermoplastic material and removed 55.5 seconds after the first injection of thermoplastic material. The nitrogen was pre-heated to a temperature of 890° F. and injected at a charging pressure of 480 psig. A satisfactory adhesion of the carpet layer to the thermoplastic backing was again obtained. However, because the Dow Pulse ABS 959 required use of higher molding temperatures, the ABS bled through the carpet layer. In addition, the carpet had been pressed flat, or matted down.

EXAMPLE 4

The procedure of Example 3 was repeated except the thermoplastic material was injected in 6.5 seconds, and the nitrogen charging pressure was reduced to 460 psig. A satisfactory adhesion of the carpet layer to the thermoplastic backing was again obtained. However, bleed through occurred and the carpet layer was matted down again because ABS was used as the thermoplastic material.

EXAMPLE 5

The procedure of Example 1 was repeated except the first clamping tonnage was 1,000 tons and the second clamping tonnage was 950 tons. The polypropylene was heated to a temperature of 440° F. and injected into the mold in 6.72 seconds. A satisfactory adhesion of the carpet layer to the thermoplastic backing was again obtained. The carpet layer was smooth and free of wrinkles. The polypropylene did not bleed through the carpet layer.

EXAMPLE 6

The procedure of Example 5 was repeated but a weight was used. This material is sold under the trademark Thermofill by Thermofill Corporation. The material was injected into the mold in 6.22 seconds. The nitrogen was heated to a temperature of 890° F. and injected at a charging pressure of 440 psig. The nitrogen was introduced into the mold 5.5 seconds after the first injection of thermoplastic material and was removed 60.5 seconds after the first injection of thermoplastic material. A satisfactory adhesion of the carpet layer to the thermoplastic backing was again obtained. The carpet layer was smooth and generally free of wrinkles. Bleed through had not occurred.

EXAMPLE 7

The procedure of Example 6 was repeated but a polypropylene having a 30% glass filler was used. A satisfactory adhesion of the carpet layer to the thermoplastic backing was again obtained. Bleed through did not occur, and the carpet layer was generally free of wrinkles.

EXAMPLE 8

The procedure of Example 1 was repeated but the first clamping tonnage was 1,000 tons and the second clamping tonnage was 950 tons. The polypropylene was heated to a temperature of 381° F. and injected into the mold in 6.1 seconds. The nitrogen was first injected into the mold 5.0 seconds after the first injection of polypropylene and was removed 60.0 seconds after the first injection of polypropylene. The nitrogen was preheated to a temperature of 830° F. and injected at a charging pressure of 420 psig. A satisfactory adhesion of the carpet layer to the thermoplastic backing was again obtained. Bleed through did not occur, and the carpet layer was generally free of wrinkles.

EXAMPLE 9

The procedure of Example 1 was repeated except a barium sulfate filled polypropylene was used. The first clamping tonnage was 950 tons and the second clamping tonnage was 900 tons. The polypropylene was heated to a temperature of 380° F. and injected into the mold in 6.07 seconds. The nitrogen was heated to a temperature of 830° F. and injected at a charging pressure of 400 psig. The nitrogen was first introduced into the mold 5.0 seconds after the first injection of polypropylene and was removed 60.0 seconds after the first injection of polypropylene. A satisfactory adhesion of the carpet layer to the thermoplastic backing was again obtained. Bleed through did not occur, and the carpet layer was generally free of wrinkles.

EXAMPLE 10

The procedure of Example 9 was repeated except the nitrogen was removed 50.0 seconds after the first injection of polypropylene. At a time of 53.2 seconds after the first injection of polypropylene the clamping tonnage was reduced to zero so that the finished thermoplastic part could be removed from the mold. A satisfactory adhesion of the carpet layer to the thermoplastic backing was again obtained. The carpet layer was free of wrinkles. Bleed through did not occur.

EXAMPLE 11

The procedure of Example 1 was repeated except a polypropylene filled with barium sulfate was used. The first clamping tonnage was 650 tons and the second clamping tonnage was 600 tons. The polypropylene was heated to a temperature of 400° F. and injected into the mold in 6.09 seconds. The nitrogen was heated to a temperature of 820° F. and injected for 3.9 seconds at a charging pressure of 490 psig. The nitrogen was first introduced at a time of 6.0 seconds after the first injection of polypropylene and was removed at a time of 62.0 seconds after the first injection of polypropylene. A satisfactory adhesion of the carpet layer to the thermoplastic backing was again obtained. The carpet layer was smooth and free of wrinkles. Bleed through had not occurred.

EXAMPLE 12

The procedure of Example 1 was repeated except a polypropylene filled with barium sulfate was used. The first clamping tonnage was 600 tons and the second clamping tonnage was 550 tons. The polypropylene was heated to a temperature of 400° F. and injected into the mold in 9.12 seconds. The nitrogen was heated to a temperature of 800° F. and injected for 4.3 seconds at a charging pressure of 325 psig. The nitrogen was first introduced into the mold 6.0 seconds after the first injection of polypropylene and removed 56.0 seconds after the first injection of polypropylene. A satisfactory adhesion of the carpet layer to the thermoplastic backing was again obtained. The carpet layer was free of wrinkles. Bleed through did not occur.

EXAMPLE 13

The procedure of Example 1 was repeated except a polypropylene filled with minerals was used. The first clamping tonnage was 600 tons and the second clamping tonnage was 350 tons. The polypropylene was heated to a temperature of 420° F. and injected into the mold in 10.27 seconds. The nitrogen was heated to a temperature of 750° F. and injected at a charging pressure of 420 psig for 3.4 seconds. The nitrogen was first introduced into the mold 8.5 seconds after the first injection of polypropylene and was removed 48.5 seconds after the first injection of polypropylene. A satisfactory adhesion of the carpet layer to the thermoplastic backing was again obtained. The carpet layer was free of wrinkles. Bleed through had not occurred.

The process of the present invention and the article produced therefrom enjoy many advantages over the prior art processes and prior art articles. For example, it has been found that material costs for producing the completed part have been reduced because an adhesive is no longer required. Secondly, because the filaments of the carpet layer are encapsulated by the thermoplastic material, a stronger and longer lasting adhesion is produced between the carpet layer and the thermoplastic backing. Thirdly, processes are known in the prior art for injection molding the thermoplastic backing to the carpet layer. However, these prior art processes require the use of high pressure injection molding. Such prior art processes cause tearing and matting of the carpet layer and bleed through of the thermoplastic backing to the exterior surface of the carpet layer because of the extremely high pressures inside the mold.

Reasonable variation and modification are possible within the spirit of the foregoing specification and drawings without departing from the scope of the invention. For example, other types of carpet can be used. Any type of carpet which is capable of being injection molded to the rigid thermoplastic backing by use of the Cinpres process can be used. In addition, some materials may be used in substitution for the carpet. These materials may include other fabrics, plastic sheet goods and fiberglass mats. Secondly, the gas used need not be nitrogen. Any gas or fluid which is inert relative to the thermoplastic material can also be used.

The embodiments for which an exclusive property or privilege is claimed are defined as follows:

1. An injection molding process for making a carpet with a synthetic resin substrate, the carpet having a fibrous surface and a back surface, the process comprising the steps of:

providing a mold comprising a pair of mold halves and a relatively thin mold cavity defined by first and second opposed mold surfaces;

positioning a carpet in the mold cavity with the fibrous surface oriented toward the first mold surface;

closing the mold halves tightly together;
thereafter injecting at an elevated pressure a molten synthetic resin into the mold into contact with the carpet back surface;
injecting a fluid into the synthetic resin to force the synthetic resin to spread throughout the entire mold to fill all portions of the cavity to thereby integrally bond the synthetic resin to the back surface of the carpet;
cooling the synthetic resin to a solid form;
venting the fluid from the mold; and
removing the carpet-backed article from the mold cavity.

2. A process according to claim 1 wherein the second mold cavity surface defines an elongated rib cavity and the synthetic resin is injected into the rib cavity.

3. A process according to claim 2 wherein the fluid is injected into the rib cavity to form a substantially hollow rib in the synthetic resin substrate.

4. A process according to claim 3 wherein the mold cavity surfaces are disposed vertically and the carpet is hung from an upper portion thereof within the mold cavity prior to the synthetic resin injecting step.

5. A process according to claim 4 and further comprising the step of retaining the carpet between the mold halves at a bottom of the mold cavity prior to the synthetic resin injecting step.

6. A process according to claim 5 wherein the synthetic resin flows from a central portion toward the edges of the cavity.

7. A process according to claim 6 wherein the synthetic resin is selected from the group consisting of a mineral filled polypropylene, barium sulfate filled polypropylene, unfilled ABS, unfilled nylon materials, polyvinyl chloride (PVC), and blends thereof.

8. A process according to claim 7 wherein the synthetic resin is a filled polypropylene.

9. A process according to claim 8 wherein the fluid is an inert gas.

10. A process according to claim 9 wherein the carpet comprises a six ounce Toni cloth and has a backing layer of a synthetic resin different from the synthetic resin substrate.

11. A process according to claim 10 wherein the synthetic resin is injected into the mold cavity at a temperature in the range of 380° to 440° F.

12. A process according to claim 11 wherein the synthetic resin is injected into the mold cavity at a pressure of 10,000 to 11,000 psig.

13. A process according to claim 12 wherein the fluid is injected into the synthetic resin at a pressure in the range of 300 to 750 psig.

14. A process according to claim 1 wherein the synthetic resin is a rigid thermoplastic resin.

15. A process according to claim 1 wherein the mold cavity surfaces are disposed vertically and the carpet is hung from an upper portion thereof within the mold cavity prior to the synthetic resin injecting step.

16. A process according to claim 15 and further comprising the step of retaining the carpet between the mold halves at a bottom of the mold cavity prior to the synthetic resin injecting step.

17. A process according to claim 1 wherein the synthetic resin is selected from the group consisting of a mineral filled polypropylene, barium sulfate filled polypropylene, unfilled ABS, unfilled nylon materials, polyvinyl chloride (PVC), and blends thereof.

18. A process according to claim 1 wherein the synthetic resin is a filled polypropylene and the fluid is an inert gas.

19. A process according to claim 1 wherein the carpet comprises a six ounce Toni cloth and has a backing layer of a synthetic resin different form the synthetic resin substrate.

20. A process according to claim 1 wherein the synthetic resin is injected into the mold cavity at a temperature in the range of 380° to 440° F.

21. A process according to claim 1 wherein the synthetic resin is injected into the mold cavity at a pressure of 10,000 to 11,000 psig.

22. A process according to claim 1 wherein the fluid is injected into the synthetic resin at a pressure in the range of 300 to 750 psig.

* * * * *